United States Patent [19]

Moser et al.

[11] Patent Number: 4,996,083

[45] Date of Patent: Feb. 26, 1991

[54] METHOD FOR DEPOSITION OF ELECTROCHROMIC LAYERS

[75] Inventors: Frank H. Moser; Niall R. Lynam, both of Holland, Mich.

[73] Assignee: Donnelly Corporation, Holland, Mich.

[21] Appl. No.: 365,216

[22] Filed: Jun. 12, 1989

Related U.S. Application Data

[62] Division of Ser. No. 16,663, Feb. 19, 1987, Pat. No. 4,855,161.

[51] Int. Cl.$^5$ .............................................. B05D 5/12
[52] U.S. Cl. .................................. 427/108; 427/126.2; 427/126.3; 427/126.5; 427/226
[58] Field of Search .................. 427/108, 126.2, 126.3, 427/126.5, 226, 165

[56] References Cited

U.S. PATENT DOCUMENTS

| | | | |
|---|---|---|---|
| 2,694,761 | 11/1954 | Tarnopol | 201/73 |
| 3,019,136 | 1/1962 | Auffenorde et al. | 427/168 |
| 3,640,093 | 2/1972 | Levene | 65/134 |
| 3,791,808 | 2/1974 | Thomas | 65/30 |
| 3,799,754 | 3/1974 | Thomas | 65/134 |
| 3,850,665 | 11/1974 | Plumat | 427/165 |
| 3,984,591 | 10/1976 | Plumat | 427/165 |
| 4,000,346 | 12/1976 | Dowell | 428/336 |
| 4,028,085 | 6/1977 | Thomas | 65/134 |
| 4,042,483 | 8/1977 | Bouy | 204/290 F |
| 4,142,005 | 2/1979 | Caldwell et al. | 427/126 |
| 4,242,374 | 12/1980 | Sansregret | 427/76 |
| 4,272,588 | 6/1981 | Yoldas | 427/162 |
| 4,308,658 | 1/1982 | Yano et al. | 427/166 |
| 4,342,792 | 8/1982 | Brown et al. | 427/34 |
| 4,347,265 | 8/1982 | Washo | 427/108 |
| 4,391,668 | 7/1983 | Armstrong | 427/126.6 |
| 4,420,500 | 12/1983 | Nakatani et al. | 427/54.1 |
| 4,535,026 | 8/1985 | Yoldas et al. | 428/310.5 |
| 4,568,578 | 2/1986 | Arfsten et al. | 428/34 |

FOREIGN PATENT DOCUMENTS

| | | |
|---|---|---|
| 2527219 | 11/1983 | France . |
| 55-011208 | 10/1980 | Japan . |
| 2028290 | 3/1980 | United Kingdom . |

OTHER PUBLICATIONS

"Metal Alkoxides", Bradley, *Advances in Chemistry Series*, pp. 10-37, 1957.

"Electrochromism of Colloidal Tungsten Oxide", Chemseddine et al., North Holland Publ., 1983.

"Sol Gel Derived Electronic Layers", Chemseddine et al. Review de Chemie Mineral, 0035-1032/84/04/487/9.

"Transition Metal Oxide Gels", Glass . . . Current Issues, 1985, Martinus Nijhoff Publishers.

"Use of Sol Gle Thin Films in Solar Energy Applications", Pettit et al., Sandia National Lab., Albuquerque, N.M. 87185.

"New Routes to Multicomponent Oxide Glasses", Dislich, Angewandte Chemie International Ed., vol. 10, No. 6, Jun. 1971, pp. 363-434.

[57] ABSTRACT

The specification discloses a method for coating a substrate with electrochromic coatings by dipping a substrate having a conductive surface into, or spraying, or spin coating with, a solution prepared by reacting an anhydrous halide of an electrochromically active transition metal with a $C_1$ to $C_5$ anhydrous alcohol, most preferably under a stream of inert gas, at 0 to 80 degrees C. The dipped substrate is removed at a rate necessary to give a desired thickness, and the resulting coating is dried and hydrolyzed and further condensed to create an electrochromically active coating.

47 Claims, 2 Drawing Sheets

*Primary Examiner*—Janyce Bell
*Attorney, Agent, or Firm*—Price Heneveld Cooper DeWitt & Litton

OTHER PUBLICATIONS

"Properties and Applications of Oxide Layers Deposited on Glass from Organic Solutions", H. Schroeder, 1961.

"Formation of Sheets and Coating Films from Alkoxides Solutions", Sakka, et al., Institute for Chemical Research, Kyoto Univ., Uji, Kyoto-Fu 611.

"Gel Method for Making Glass", Sakka, Treatise on Materials, Science and Technology, vol. 22, 1982, by Academic Press (p. 164).

"Pip Coatings: Characteristics, Properties, Applications", Hussmann, Symposium on Optical Service Technology, SPIE, vol. 381, 1983.

"Oxide Coatings from the Sol Gel Process", Klein, Proceedings of the Twelfth Automotive Materials Conference, 1984.

"Better Ceramics through Chemistry", Sheppard, ME, Jun. 1984.

"Spray Deposition and Properties of Electrochromic Tungsten Oxide", 7/86.

"Metal Alkoxides", Bradley et al., 1978, pp. 7-9 and 14-39.

"Peroxotungstic Acid Coated Films for Electrochromic Display Devices", Yamanaka et al., Jun. 21, 1986.

METHOD FOR DEPOSITION OF ELECTROCHROMIC LAYERS

This is a division of application Ser. No. 016,663, filed Feb. 19, 1987, now U.S. Pat. No. 4,855,161.

BACKGROUND OF THE INVENTION

The present invention relates to methods for producing electrochromic films on glass or equivalent substrates, such as ceramics. Electrochromic films undergo reversible coloration induced by an applied electric field or current. These solid-state inorganic electrochromic layers can be broadly classified into those that color cathodically due to dual injection of electron and ion (typically Group VI-B oxides such as $WO_3$ and $MoO_3$) and those that color anodically due to dual ejection of electron and cation or electron ejection/anion injection (typically Group VIII oxides such as $IrO_2$, $Rh_2O_3$, $NiO$ and $CoO$). Such coatings are used in information display devices, solar control windows, and light modulators.

Vacuum techniques, typically evaporation and sputtering, are widely used to deposit electrochromic thin films. Nonvacuum techniques such as anodization and atmospheric chemical vapor deposition are also reported. Evaporation deposition and sputter coating require a high vacuum. The necessary equipment is expensive, making such processes capital intensive. However, they have been commonly used to produce electrochromic coatings.

Three similar nonvacuum coating techniques which have not been used to any significant degree for electrochromic coatings are dip coating, spray coating, and spin coating. Dip coating is commonly used to coat glass with $Si_2$. It involves lowering a glass substrate into a solution containing an appropriate precursor of the desired oxide.[1] This is typically a solution of a partially hydrolyzed alkoxide dispersed in a suitable organic solvent, e.g., tetraethylorthosilicate dissolved in an ethanolic solution and partially hydrolyzed. After dipping the substrate into the solution, the glass is withdrawn at a controlled rate. As the glass is withdrawn (typically at a rate of several centimeters per minute), the solution coats the surface. The coating is then dried and fired in an oven to complete hydrolysis and condensation and to densify the newly formed oxide coating.

[1] Spin coating and spray coating are similar except that instead of dipping the glass, the precursor solution is applied to the glass, which is spun to spread the coating out, or is sprayed onto heated glass.

However, the alkoxylates of some of the important electrochromic metal oxides do not afford satisfactory coating results if directly dissolved in typical solvents. For example, unsatisfactory results have been obtained attempting to dip coat a glass substrate in a solution formed by dissolving tungsten butyrate in alcohol solution. Hence, an important low cost approach to creating electrochromic coatings appears to be impractical based on present technology.

French Patent No. 2,527,219 discloses dipping in a colloidal polymetallic acid of a transition metal preferably in aqueous medium. However, such suspensions are reported to be very unstable, having a useful life of 24 hours or less.

SUMMARY OF THE INVENTION

In the present invention, electrochromic coating solutions are prepared by reacting anhydrous transition metal halides, preferably chlorides, such as tungsten chloride, with lower carbon, anhydrous alcohols at 0 degrees to 80 degrees C. A substrate with a conductive surface is preferably dipped into the resulting solution and removed at a rate sufficient to give a coating of the desired thickness over the conductive surface, though spray or spin coating can be used in the broader aspects of the invention. The coating is then dried and fired in an oven to complete the hydrolysis and condensation to yield an electrochromic oxide coating having exceptional electrochromic properties.

These and other objects, aspects, and advantages of the invention will be more fully understood and appreciated by reference to the written specification and appended drawings.

DESCRIPTION OF THE PREFERRED EMBODIMENT

Successful electrochromic coating requires that:

1. The coating solution must have an adequate shelf life, preferably two weeks or longer. It must not gel or particulate and it should be stable within the expected usage lifetime, preferably two weeks or longer.

2. The solution must coat the substrate easily. It must wet the surface and fire to a clear oxide with good cosmetics.

3. Once fired, the coating must be functional. It must have the desired hardness, adhesion, optical properties, electrical properties, etc.

These objectives are met in the present invention where in the preferred embodiment, the anhydrous transition metal halide, preferably a chloride, is slowly added to the anhydrous lower carbon alcohol, preferably under a stream of gas. The reaction vessel is fitted with a stirrer, a thermometer, and with a reflux condenser to minimize alcohol loss.

Basically, the chemistry involves the formation in the dip solution of a transition metal alkoxylate and hydrogen halide. When dipped onto the substrate, hydrolysis and condensation of the alkoxylate is completed either by exposure to air containing at least some moisture at room temperature or by firing in such air to give the transition metal oxide. However, the surprisingly superior coatings obtained using the present invention suggest that more is occurring which cannot be explained by this simple example.

The stream of gas carries some of the hydrogen halide from the reaction vessel. After a sufficient time, the reaction mixture is filtered at room atmosphere, the glass is dipped preferably at a relative humidity below 30%, slowly removed and further hydrolyzed and condensed to operate an electrochromic coating.

For electrochromic coatings, the transition metal must be electrochromically active. Transition metal halides which can be used in the present invention include those of tungsten, vanadium, chromium, iridium, molybdenum, manganese, and others. Nickel halide is also operable, but only under special circumstances discussed below. Higher valence halides are preferred. Anhydrous halides must be used since any water in the system will hydrolyze the alkoxy compound prematurely. Chloride is the preferred halide, though the others are broadly operable.

The alcohol used should be a 1 to 5 carbon alcohol, and most preferably a 1 to 3 carbon alcohol. Thus, the most preferred alcohols are methanol, ethanol, propanol, isopropanol, and mixtures thereof. The butyl and pentyl alcohols are broadly operable, but the higher alcohols, and sometimes even the butyl and pentyl alcohols, will sometimes result in transition metal precipitates.

Sometimes, solubility can be enhanced and other advantages achieved by using mixtures of alcohols. For example, the use of a methanol and ethanol mixture solubilizes nickel halide to a greater degree.

The preferred method of mixing the reactants is to slowly add the transition metal halide to the alcohol. However, variations of this procedure are operable as is illustrated by the examples set forth below.

The ratio of transition metal halide to alcohol will be varied by the formulator as a function of the thickness of the coating desired, the intended substrate withdrawal rate and the solubility of the halide in the solution. If the solution concentration and withdrawal rate result in too heavy a coating, the coating may crack during drying. Typical solutions will comprise from about 5 to about 20 weight/volume (gms/ml) percent transition metal halide to alcohol, for withdrawal rates of 8 to 50 centimeters per minute.

The reaction proceeds at temperatures of 0 to 80 degrees C. Allowing the reaction to run at higher temperatures, as for example 80 to 100 degrees C., sometimes results in the formation of an insoluble by-product. For some metal halides, cooling may be required, and for some, additional heat may be required.

Throughout the reaction, a stream of gas is preferably passed over the reaction solution. This facilitates removal of hydrogen halide formed in the reaction. An inert gas such as nitrogen or argon is preferred. To further promote removal of the hydrogen halide, it is preferable to use only a small part of the alcohol during the transition metal halide addition. The remainder of the alcohol is added thereafter.

A dry inert gas is preferably used so that premature hydrolysis of the metal alkoxylate is avoided. In this regard, it is also preferable that the solution be stored under an inert gas, i.e., by making sure that the head space in the solution container is occupied with an inert gas.

The precise reaction time will vary with the transition metal halide and alcohol used. Routine experimentation will result in a determination of the best time under each given set of circumstances. However, the reaction will typically be allowed to proceed for from about 4 to 24 hours. The use of a reflux condenser minimizes the loss of alcohol from the reaction mixture. The reaction is typically exothermic such that cooling will be required to maintain the preferred temperature range. However, heat is required for some metal halides.

The substrate itself must have a conductive surface. Good conductivity is important to achieving a fast response time in the electrochromic coating. In the case of glass or ceramic substrates, such conductivity at the surface can be achieved by applying a conductive coating prior to the electrochromic coating. Preferably, this coating has a sheet resistance of less than 10 ohms per square.

In glass applications where one should be able to see through the glass and the conductive coating, it is important that the conductive coating be very thin so that light transmission is not excessively inhibited. In order to achieve a sheet resistance of less than about 10 ohms per square and still have a coated piece of glass with a light transmission of 85% or greater, the material used to create the conductive coating should have a specific resistivity of less than about $3 \times 10^{-4}$ ohm centimeters, and most preferably less than about $2 \times 10^{-4}$ ohms centimeters. Indium tin oxide coatings (ITO) can be achieved which have a specific resistivity of about $2 \times 10^{-4}$ ohms centimeters. ITO is the most preferred coating material for glass, ceramic or equivalent substrates which themselves are nonconductive.

Upon completion of the reaction, the solution is filtered. The substrate is then dipped into the solution and slowly removed. The removal rate selected will be a function of the coating thickness desired. Typical removal rates will fall between about 8 to 50 centimeters per minute. Such a removal rate will yield coatings of from 500 to 2000 angstroms or more. Advantageously, the faster the withdrawal rate, the thicker the coating.

Figure 1:
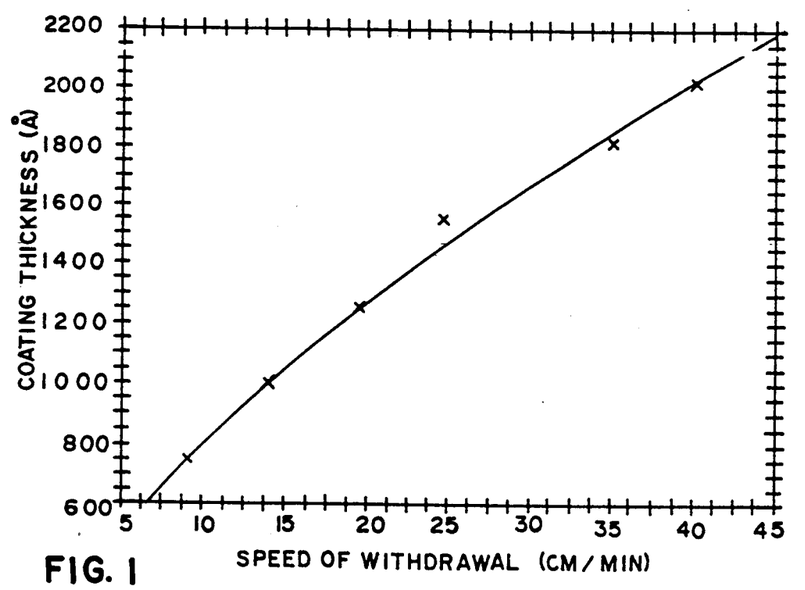
FIG. 1 plots the after-fired thickness of tungsten oxide film against the substrate withdrawal rate, using a constant concentration alkoxy solution and constant firing conditions.

Coating thickness can generally be determined by the following formula:

$$t = \left( \frac{2 V_s n}{dg} \right)^{\frac{1}{2}}$$

where:
t = Coating thickness
$V_s$ = Withdrawal rate
n = Viscosity
d = Coating density
g = Gravitational constant The relationship between final coating thickness and withdrawal rate for a specific dipped and fired tungsten oxide film, at a specific constant concentration and under specific constant firing conditions is illustrated in FIG. 1. The coating thickness can be varied as indicated over a wide range merely by regulating withdrawal rate. Since thicker coatings are typically desired, it is particularly advantageous that thicker films result using faster withdrawal rates.

Surprisingly, the introduction of a wetting agent into the dip solution enhances the quality of the thicker coatings (in excess of 2000Å) after firing. Normally, the thicker coatings have poor cosmetics. They are spotty, or appear runny. By adding 5 to 20% by volume, preferably 10 to 15% by volume, of wetting agent to the dip solution, preferably after reaction, one can obtain thick coatings of excellent cosmetic quality. Such single dip coatings of 3500Å or more have been obtained, as have triple dip coatings of around 9000Å.

Hydrolysis and condensation of the resulting coating is then completed by exposure to atmosphere and by firing at temperatures of about 100 degrees C. to about 350 degrees C. Firing is allowed to proceed for from about 15 to about 120 minutes. Different metal alkoxy coatings will require differing firing conditions, as will be appreciated by reference to the examples herein, some being useful without firing.

Figure 2:
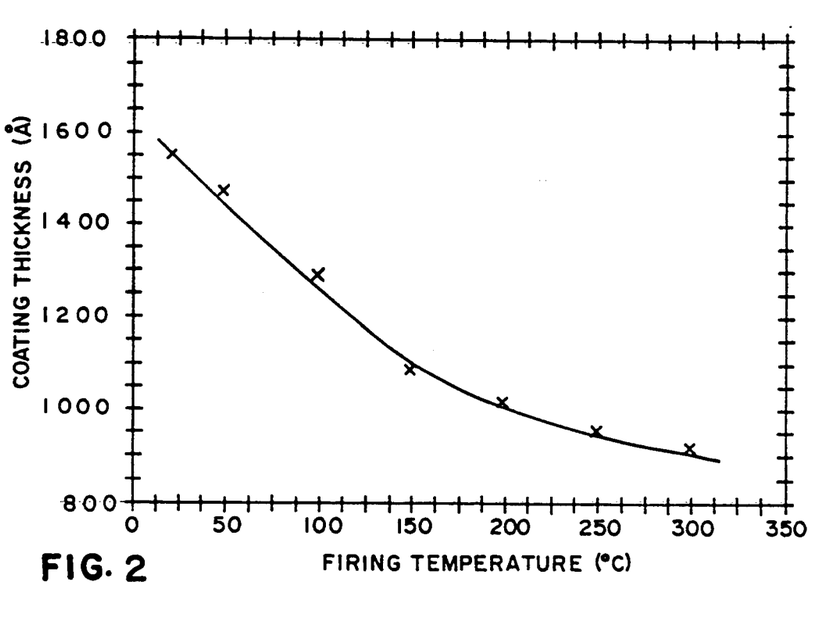
FIG. 2 plots film density, as measured by after-firing thickness, against variation in firing temperature where the prefiring coating thickness was the same in all cases.

Firing also has an important impact on coating density and electrochromic coloring efficiency. FIG. 2 shows the coating density for tungsten oxide, as measured by after-firing thickness, plotted against firing temperature. Since all of the coatings were applied to the same thickness before firing, the thinner coatings after firing are more dense than the thicker. Increasing firing temperature increases film density. This makes the film tougher and more resistant to scratching and the like.

Figure 3:
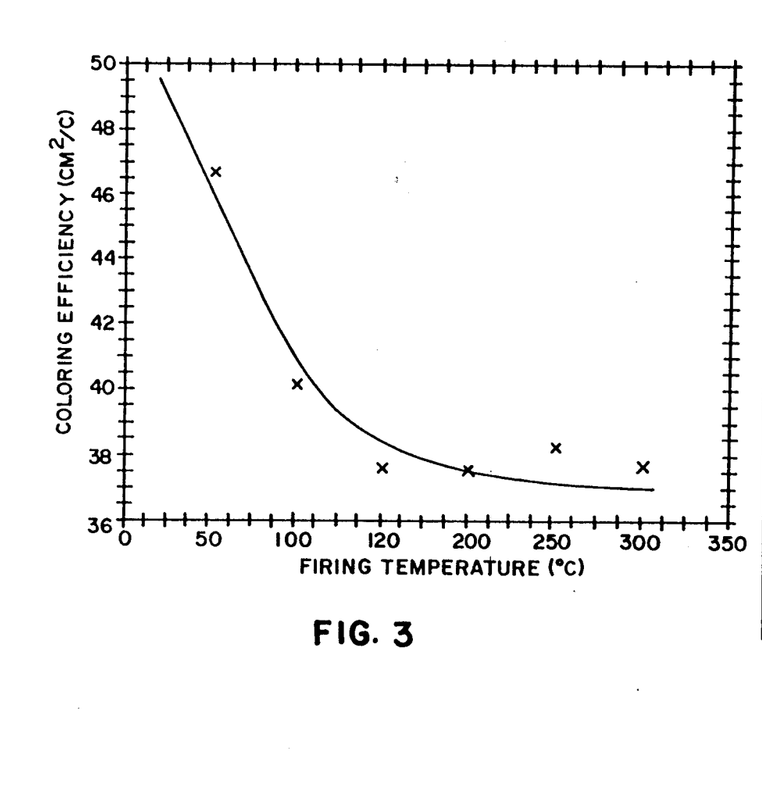
FIG. 3 plots coloring efficiency against firing temperature.

However, the desirability of a tougher film must be balanced against the coloring efficiency of the film. Coloring efficiency is a measure of color produced (or depth of coloring) in a film of unit area (e.g., $cm^2$) when it stores a unit amount of charge (e.g., coulomb). As illustrated in FIG. 3, coloring efficiency is decreased as firing temperatures are increased. The firing is done in air.

Figure 4:
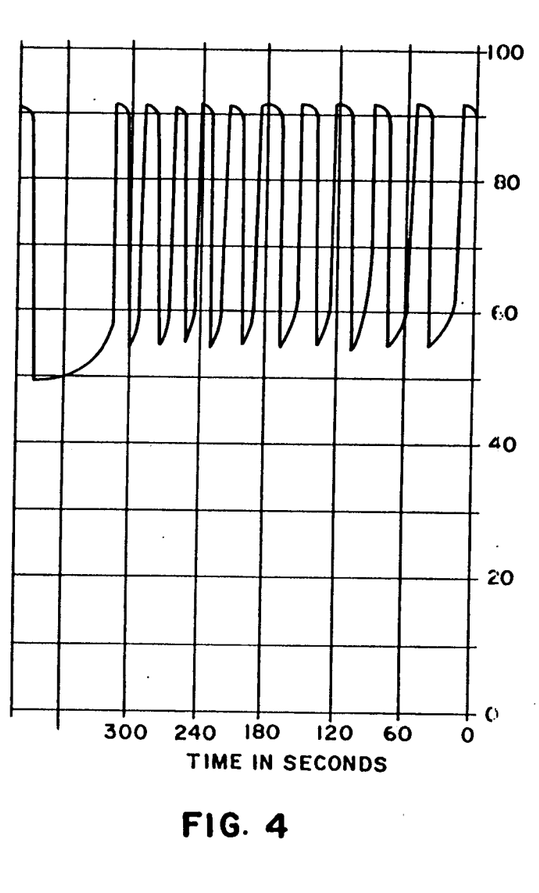
FIG. 4 is a graph showing percent light transmission versus time for a repeatedly cycled tungsten oxide coating.

The optical transmission of typical coatings made in accordance with the present invention decreases from in excess of 90% to less than 60% in a matter of seconds, giving an easily visible and rapid color change. A typical result is shown in FIG. 4 for a tungsten oxide coating, which is repeatedly cycled from colored to clear.

A modification of the foregoing process is required for reacting nickel halide and further modification is preferred for dip coating in the resulting nickel alkoxy solution. In the reaction, nickel halide does not react particularly well with the alcohol. The reaction is promoted, however, by adding an alkali metal alkoxy compound to the solution. Typically, the amount of alkali metal alkoxy compound added is equivalent to from about 10 to about 100% by weight of the nickel halide in the solution.

Further upon dip coating, it is preferable to modify the nickel alkoxy solution by mixing it with an equal amount of an alcohol solvent silica coating solution containing from about 5 to about 10% partially hydrolyzed tetraethyl-0-silicate. This results in a coating with superior hardness and superior adherence to an underlying glass or ceramic substrate. The ratio of the partially hydrolyzed tetraethyl-0-silicate solution to the nickel alkoxy solution is 10:90 to 75:25, preferably 50:50.

EXAMPLES

Preparation of the coating solutions in accordance with the present invention is illustrated by the following Examples:

EXAMPLE 1

A coating solution of nickel alkoxy for electrochromic use was made by refluxing 50 g ground anhydrous nickel chloride (dried to constant weight at 100 degrees C.), 500 ml anhydrous denatured alcohol, and 50 ml methanol for an hour with agitation, followed by partial cooling of the product and the addition of 21.25 g sodium ethylate powder with agitation. It was then followed by refluxing the mixture in air for six hours. The mixture was allowed to cool and settle for 18 hours. The supernatant liquid was filtered at room atmosphere to remove insoluble material. Then, 500ml ethyl acetate was added. The solution was filtered again.

Electrically conductive indium tin oxide (90:10 ratio) coated glass was dipped into the resulting clear green nickel solution and removed at a rate of 25 cm per minute. The resulting coating was dried and hydrolyzed at room temperature by exposure to moisture in the air. Some of the dipped glass was then additionally fired at 300 degrees C. for one hour. The nickel oxide coating was 500Å thick after firing.

The coating of the dipped and fired glass showed good electrochromic properties. When formed in an electrochemical cell in 1 N KOH solution and with a platinum counterelectrode, and activated with an electric potential of two volts, the coating showed a reversible change in optical transmission at 550 nm from 93% to 75% (i.e., a change of 18% in transmission). A similar coated but not fired glass piece was made into an electrochromic cell in the same manner and showed a reversible change in optical transmission at 550nm of 20% (92% to 72%).

EXAMPLE 2

100 ml anhydrous denatured ethanol (Tecsol ™ 3 anhydrous) was slowly added to 20 g tungsten hexachloride at 20 degrees to 25 degrees C. cooling by means of a water bath. Argon or nitrogen was passed over the mixture to remove the hydrogen chloride formed. The solution was held at 20 degrees to 25 degrees C. for three hours with the argon flowing. It was then stirred for 18 hours under a layer of argon. 200 ml denatured ethanol (Tecsol ™ 3 anhydrous) was added. The solution was filtered (keeping it covered with argon) and washed with 125 ml Tecsol ™ 3. The solution was stored under argon.

Electrically conductive indium tin oxide (90:10) coated glass was dipped in the above solution and removed at 25 cm per minute. The coating was dried at ambient temperature. The coating was then fired at 300 degrees C. for 30 minutes. The fired coating thickness was 693Å. When a test piece was made into an electrochromic cell with 1N sulfuric acid and a platinum counterelectrode, it showed a reversible change of 18% (91% to 73%) in optical transmission at 550 nm when subjected to a potential of two volts.

EXAMPLE 3

1.9 g iridium trichloride was added to 25 ml anhydrous Tecsol ™ 3 Then, 1 g of powdered sodium ethylate was added along with 5 ml more Tecsol ™ 3. Argon was passed over the mixture, and it was heated to reflux (75 to 76 degrees C.) for two hours. 20 ml of Tecsol ™ 3 was added to compensate for solvent loss in the argon stream. The solution was stirred overnight under a layer of argon. The solution was then filtered in room atmosphere to remove insolubles and to provide a clear solution for dipping.

Electrically conductive indium tin oxide coated glass was dipped into this solution and removed at 25 cm per minute. After drying in air, the coating was heated to 200 degrees C. for one hour. It was tested in an electrochromic cell made with 1 N sulfuric acid as in Example 2. It showed a reversible change of 20% (from 86% to 64% optical transmission) at 550 nm.

EXAMPLE 4

30 ml isopropyl alchol was added to 20 g anhydrous tungsten hexachloride in a flask equipped with an agitator, thermometer, and gas entry tube. There was an immediate reaction and hydrogen chloride evolved. Argon was passed over the mixture for four hours to remove the hydrogen chloride. The mixture was allowed to stand overnight under argon. In the morning, argon was again passed over the mixture for an hour. 300 ml isopropyl alcohol was then added while keeping the temperature below 40 degrees C., and the solution stirred for 30 minutes. The solution was filtered to remove some blue precipitate. The filtration was done under argon and the solution stored in an argon filled bottle. Electrically conductive indium tin oxide coated glass was dipped in the solution in air at room temperature.

Removal of the glass at 25 cm per minute and heating it to 150 degrees C. for an hour completed preparation of the glass. It gave a coating 800Å thick. An electrochromic cell made from this glass, as in Example 2, gave a reversible change in optical transmission at 550 nm of 87% to 64% or a 23% change when subjected to two volts potential.

EXAMPLE 5

30 ml sec. butyl alcohol was added to 20 g anhydrous tungsten hexchloride in a 500 ml flask equipped with a stir bar agitator, thermometer, gas entry tube, and reflux condenser. Hydrogen chloride evolved. Argon was passed over the solution for four hours to remove the hydrogen chloride gas. The solution was stirred all night under argon. In the morning, 250 ml of sec. butyl alcohol was added. The solution was strongly blue in color, a much stronger blue in color than Example 4. It was filtered under argon and stored in an argon filled bottle. Electrically conductive indium tin oxide coated glass dipped in the filtered solution and heated as in Example 2 formed a cosmetically good coating. The coating at a removal rate of 25 cm per minute had a 1515Å thickness after firing. When tested as in Example 2, the coating had a 30% reversible change in optical transmission at 550 nm.

EXAMPLE 6

10 g molybdenum pentachloride was slowly added to 100 ml Tecsol ™ 3 anhydrous at 22 degrees to 30 degrees C. in a 500 ml flask equipped with a magnetic stir bar, reflux condenser, gas entry tube, and thermometer. Much hydrogen chloride evolved and was removed by a stream of argon. The mixture was stirred six hours under argon. 100 ml anhydrous ethanol (Tecsol ™ 3) was then added and stirred for an hour. The solution was filtered and stored under argon.

Two percent of a wetting agent (Mazawet ™ DF) was added to the solution and electrically conducting indium tin oxide coated glass was dipped and removed at a rate of 25 cm per minute. The resulting coating was fired at 300 degrees C. for one hour. It was electrochromic when tested in a cell with IN lithium perchlorate solution in propylene carbonate with a platinum counterelectrode. It had a 15% reversible change in optical transmission at 550 nm (from 89% to 74%) when subjected to a potential of two volts.

EXAMPLE 7

100 ml methanol was placed in a 500 ml flask fitted with a reflux condenser, stir bar agitator, gas entry tube, and thermometer. Argon flow was started. The flask was placed in a cold water bath and 20 g of tungsten hexachloride was added slowly at 20 to 25 degrees C. with agitation. A vigorous reaction evolved hydrogen chloride. Argon gas was continuously passed over the solution for three hours at 35 to 40 degrees C., another 100 ml of methanol was added while continuing the argon flow and agitation. The solution was then filtered under argon and stored in a bottle under argon. Electrically conductive indium tin oxide coated glass was dipped into the filtered solution and removed at a rate of 25 cm/minute. The pieces thus coated were fired at 100 degrees C. and then fabricated into an electrochromic device as in Example 2. They had excellent electrochromic properties as indicated by a reversible change of 17% in optical transmission at 550 nm (85% to 68%) when subjected to a potential of 2 ¼ volts.

EXAMPLE 8

100 ml tertiary butyl alcohol were placed in a 500 ml round bottomed flask fitted with a stir bar, reflux condenser, thermometer, and gas entry tube. Argon was passed into the flask and 20 g tungsten hexachloride added at 30 to 35 degrees C. The reaction evolved hydrogen chloride which was removed by the argon gas flow. After five hours, another 100 ml of tertiary butyl alcohol was added. After another hour, the mixture was filtered (under argon) and placed in an argon filled bottle. After filtering, the solution was used to coat electrically conducting indium tin oxide coated glass, as in Example 2. The glass was then heated to 100 degrees C. for an hour giving a 717Å thick coating, and the glass so coated checked for electrochromic properties. The coating had a reversible electrochromic change in optical transmission at 550 nm of 11% (90% to 79%) in a cell with 1 N sulfuric acid and with a platinum counterelectrode when subjected to 2 ¼ volts potential.

EXAMPLE 9

100 ml denatured ethyl alcohol (Tecsol ™ 3 anhydrous) and 20 ml methanol were added to a 500 ml flask with a stir bar agitator, water cooled condenser, thermometer, and argon gas entry tube. The solution was covered with argon gas and 10 g chromium chloride ($CrCl_3$) was added. The mixture was then refluxed (60 to 70 degrees C.) for six hours. Then, 75 ml more Tecsol ™ 3 was added. The refluxing was stopped and the solution remained under argon all night. It was refluxed eight hours again under argon and allowed to stir with no heat all night under argon. It was filtered to assure clarity and 25 ml more Tecsol ™ 3 was added. The solution was stored in an argon filled bottle. Electrically conductive indium tin oxide coated glass was dipped into the solution and removed at a rate of 25 cm per minute, fired at 300 degrees C. for an hour, and tested for electrochromic properties. A cell made with the glass, a lithium perchlorate solution in propylene carbonate and with a platinum counterelectrode had a reversible change in optical transmission at 550 nm of 2.5% (68.5% to 66%) when subjected to two volts.

EXAMPLE 10

20 g of tungsten hexachloride was added in 15 minutes at a temperature of 19 to 45 degrees C. to 100 ml isopropanol in a 500 ml round bottom flask fitted with a reflux condenser, themometer, stir bar, and gas entry tube. The solution was yellow at first and became blue at 45 degrees C. Argon was passed over the isopropanol before, during, and after the tungsten hexachloride addition. Then 180 ml more isopropanol was added. The solution was heated to 50 degrees C. and held at 50 to 55 degrees C. for four hours. It was then cooled to 25 degrees C., filtered under argon, and stored in an argon filled bottle.

Electrically conductive indium tin oxide coated glass was dipped into the solution and removed at a rate of 45 cm per minute. It was then fired at 300 degrees C. for one hour. The fired coating was 850Å thick. It was tested for electrochromic properties by making a cell with the glass, 1N sulfuric acid, and a platinum counterelectrode. A two volt potential caused a reversible change of 20% (74% to 54%) in optical transmission at 550 nm.

This solution was also sprayed as a fine mist onto conductive coated glass that had been preheated to 325 degrees C. The solution coated the glass with good cosmetic appearance and the glass showed good electrochromic performance when tested as above. The reversible change in optical transmission was 23% (90% to 67%).

1.5 ml of this solution was placed on conductive coated glass which was then spun at 2,000 rpm. The coating evenly wetted the surface. The coating was then fired at 300 degrees C. for 20 minutes. The coating showed good cosmetic and good electrochromic properties reversibly changing 23% (92% to 69%) in optical transmission when tested as above.

EXAMPLE 11

Since the solutions are compatible, the process has a remarkable ability to produce mixed coatings, containing mixtures of metal oxides. 90 ml of the solution of tungsten hexachloride produced in Example 10 was mixed under ambient conditions with 10 ml of the molybdenum pentachloride solution produced in Example 6. Electrically conductive indium tin oxide coated glass was dipped into the mixed solution. It was fired at 100 degrees C. for 60 minutes and gave a 994Å thick coating that contained tungsten and molybdenum oxides in a 88% to 12% ratio. The glass made into a cell with 1 N sulfuric acid and a platinum counterelectrode, gave a reversible change in optical transmission at 550 nm of 32% (78% to 46%) with a 2 ¼ volt potential.

Mixtures of 80 ml of the solution produced in Example 10 and 20 ml of Example 6 gave a similar effect. Dipped and fired as above, it gave a 800Å thick coating (77% of tungsten oxide and 23% molybdenum oxide) and showed a reversible electrochromic change in optical transmission at 550 nm of 25% (73% to 48%) when tested as above.

A mixture of 60 ml of the solution in Example 10 and 40 ml of the solution of Example 6 also produced similar results with a ratio of 56% tungsten oxide to 44% molybdenum oxide in the coating. Dipped and fired as above, it gave a 800Å thick coating and made into a cell as above, it showed a reversible electrochromic change in optical transmission at 550 nm of 18% (83% to 65%).

EXAMPLE 12

An improvement in the nickel coating was made by mixing the nickel solution, obtained in Example 1, with a silica coating solution containing about 7% of silica. The silica forming solution was made by the hydrolysis of an alcoholic solution of tetraethyl-o-silicate with 75% acetic acid. The ratio of nickel solution to silica forming solution can be varied from 1:0.1 to 1:2 or more or less.

A ratio of 1:1 gave the following results: Electrically conducting indium tin oxide coated glass was dipped into the 1:1 solution and removed at a rate of 25 cm per minute. The coated glass was fired at 350 degrees C. for 30 minutes. The coating was harder and had better adhesion to the glass than the coating obtained from the solution in Example 1 without silica. The glass was made into an electrochromic cell with 1 N KOH and a platinum counterelectrode. The reversible change in optical transmission at 550 nm was 53% (100% to 47%) at a potential of 2 ¼ volts.

EXAMPLE 13

In a flask equipped as in Example 4, 9.7 g tungsten pentabromide was slowly added to 100 ml isopropyl alcohol with argon over it, holding the temperature at 23 to 28 degrees C. by the slow addition. Agitation was continued at room temperature (22 degrees C.) for 22 hours in an argon atmosphere. The resulting solution was filtered under argon from a small amount of residue and placed in an argon filled bottle.

Electrically conducting indium tin oxide (90:10) coated glass was dipped in the filtered solution in air and removed at a rate of 25 cm per minute. The glass was then heated to 300 degrees C. for an hour. It showed a reversible change in optical transmission at 550 nm of more than 17% (81% to 64%) when tested electrochromically in a 1 N 30 potassium hydroxide solution cell as in Example 12, when subjected to a potential of two volts.

EXAMPLE 14

11.15 g of vanadium triflouride oxide was added to 100 ml of isopropyl alcohol at 23 to 30 degrees C. with argon flowing over it. The mixture was then heated to reflux (75 to 78 degrees C.) and allowed to reflux for five hours. The solute went into solution almost completely. Argon was kept flowing over the solution during the refluxing. The solution was stirred overnight (18 hours) under argon. It was filtered under argon and placed in an argon filled bottle.

Electrically conducting indium tin oxide coated glass was dipped into the solution and removed at 25 cm per minute. It was fired at 300 degrees C. for 30 minutes. The glass was tested for electrochromic properties in a cell made with 1 N solution lithium perchlorate in propylene carbonate and with a platinum counterelectrode and showed a 15% (57% to 42%) reversible electrochromic change in optical transmission at 550 nm, when subjected to a potential of two volts.

EXAMPLE 15

10 g of molybdenum diiodide was added to 100 ml anhydrous denatured alcohol covered with argon at 23 to 25 degrees C. The mixture was then heated to reflux (75 to 78 degrees C.) for five hours under argon and stirred under argon overnight (18 hours) at room temperature (22 degrees C.). The solution was filtered under argon from some residue.

Electrically conducting indium tin oxide coated glass was dipped into the solution in air three times at a removal rate of 25 cm per minute to build up a sufficient layer for testing. It was then fired at 300 degrees C. for 30 minutes. When tested for electrochromic properties as in Example 14, it gave a 3% (54% to 51%) reversible change in optical transmission at 550 nm, when subjected to a potential of three volts.

EXAMPLE 16

In a 500 ml flask with a stir bar agitator, condenser, thermometer, and gas entry tube, 10 g nickel bromide anhydrous was added to 10 ml methanol and 80 ml ethanol anhydrous, denatured (Tecsol ™ 3) Argon was passed over the mixture and it was refluxed (74 to 76 degrees C.) for five hours. The solution was allowed to cool to room temperature (20 to 22 degrees C.) and stirred overnight (18 hours). The solution was filtered through a fine filter paper. It was washed with ethyl acetate and in all 40 ml of ethyl acetate added.

To improve the wetting of the above solution for glass, 1.5 ml of Mazawet™ DF, a nonionic wetting agent was added to the solution. Electrically conducting indium tin oxide (90:10) coated glass was dipped in this solution and removed at the rate of 25 cm per minute. The glass was then heated to 300 degrees C. for an hour and to 350 degrees C. for 30 minutes. When tested for electrochromic properties, the glass showed a 5% (70% to 65%) reversible change in optical transmission from a cell made with 1 N potassium hydroxide and a platinum counterelectrode with a potential of two volts.

EXAMPLE 17

10 g vanadium oxytrichloride (liquid) was added dropwise to 100 ml isopropyl alcohol at 25 to 35 degrees C. with argon gas over the isopropyl alcohol. Argon flow was continued and the mixture refluxed (75 to 78 degrees C.) for five hours. The reaction was reddish in color but turned much darker during the five hours. The solution remained under argon all night. The next day it was heated to reflux again for five hours. It turned green during that time. The solution was then filtered under argon and stored in an argon filled bottle. Electrically conductive indium tin oxide coated glass was dipped into and removed from the filtered solution at a rate of 25 cm per minute and fired at 300 degrees C. for one hour.

When the glass was evaluated for electrochromic properties in a cell with IN lithium perchlorate solution in propylene carbonate and a platinum counterelectrode, it showed a reversible change in optical transmission at 550 nm of 25% (73% to 48%) when subjected to a 2 3/10 volt potential.

EXAMPLE 18

75 ml of a tungsten solution as made in Example 10, and 25 ml of the vanadium solution above (Example 17) were mixed and coated on electrically conductive indium tin oxide coated glass (90:10) by dipping into and removal at a 25 cm per minute rate. The coated glass was heated to 300 degrees C. for two hours and cooled. The coating thickness was 2080Å. The glass showed 20% (85% to 65%) reversible change in optical transmission at 550 nm when it was made into a cell made with 1 N sulfuric acid, and a platinum counterelectrode and subjected to a potential of two volts.

A mixture of 90 ml of the tungsten solution of Example 10 and 10 ml of the vanadium solution of Example 17 were mixed and blended very well. When electrically conducting indium tin oxide coated glass was coated and fired as above, the coating thickness was 1550Å. The glass was tested for electrochromic properties as above in this Example. It also showed a 20% (84% to 64%) reversible change in optical transmission.

EXAMPLE 19

9.7 g molybdenum dibromide dioxide was added to 100 ml anhydrous denatured alcohol with stirring and with the solution covered with argon. The temperature rose from 23 to 30 degrees C. The solution was refluxed (75 to 78 degrees C.) for three hours and was stirred under argon for 40 hours. During reflux, the solution turned from a light tan to dark brown in color. The solution was coated on electrically conductive indium tin oxide coated glass (removed at 25 cm per minute) and fired at 400 degrees C. for one hour.

When the glass was made into a cell with IN lithium perchlorate in propylene carbonate and a platinum counterelectrode, it showed a reversible change in optical transmission at 550 nm of 12% (75% to 63%) when a potential of two volts was applied.

EXAMPLE 20

10 g anhydrous molybdenum tribromide were added to 100 ml isopropyl alcohol and a slow stream of argon was passed over the mixture. The mixture was refluxed for three hours. 50 ml methanol was added and the refluxing (74 to 76 degrees C.) continued another three hours. The mixture was allowed to stir for 70 hours under argon. It was then filtered by vacuum from some of the molybdenum tribromide and any other particulate matter.

Electrically conductive indium tin oxide coated glass was dipped into the solution and removed at a rate of 25 cm per minute. The glass was heated to 300 degrees C. for 15 minutes. When the test piece was made into an electrochromic cell with 1 N lithium perchlorate in propylene carbonate as the electrolyte and a platinum counterelectrode, the coating showed a reversible change of 5% (90% to 85%) in optical transmission at 550 nm on the application of a potential of two volts.

EXAMPLE 21

5.2 g molybdenum dibromide was added to 50 ml anhydrous denatured alcohol (Tecsol™ 3) and argon was passed over the mixture in a slow stream. The mixture was refluxed (74 to 78 degrees C.) for three hours. It was stirred without heat under argon for 40 hours. It was then refluxed five hours under argon and stirred under argon 20 hours. It was stirred in air for 33 hours. The solution was filtered from some solid.

Electrically conductive indium tin oxide coated glass was dipped in the solution and removed at a rate of 45 cm per minute. The glass was fired at 300 degrees C. in a furnace for an hour. A test piece was made into an electrochromic cell with 1 N lithium perchlorate in propylene carbonate and a platinum counterelectrode; it gave a 4% (95% to 91%) reversible change in optical transmission at 550 nm on the application of a potential of two volts.

EXAMPLE 22

9.3 g vanadium tribromide was added to a mixture of 10 ml methanol and 100 ml Tecsol™ 3 anhydrous. Argon was passed over the mixture slowly. The mixture was then refluxed (74 to 76 degrees C.) for five hours. The mixture was stirred 18 hours under argon. It was filtered from a trace of insoluble material. Three percent of wetting agent (Mazawet™ DF) was added to help the solution to coat the electrically conductive indium tin oxide coated glass properly. The test piece was dipped and removed from the solution at 25 cm per minute. It was heated to 300 degrees C. for 45 minutes. The resulting coating was 2600Å thick.

The glass so coated was made into an electrochromic cell as in Example 21. It showed a reversible change in optical transmission at 550 nm of 9% (47% to 38%), when a potential of two volts was applied.

EXAMPLE 23

10 g anhydrous nickel iodide was added to a mixture of 10 ml methanol and 100 ml Teosol™ 3 anhydrous. Argon was passed over the solution and the solution was heated to reflux (74 to 76 degrees C.) for six hours. The solution was filtered in air. Electrically conductive indium tin oxide coated glass was coated by removing it at 25 cm per minute from the filtered solution. This test piece was fired at 300 degrees C. for one hour.

When the glass was made into an electrochromic cell as in Example 21 but using 1 N sulfuric acid as the electrolyte and a platinum counterelectrode, the cell showed a 2.5% reversible change in optical transmission at 550 nm (80.5% to 78%) when subjected to a potential of two volts.

EXAMPLE 24

The object of this Example is to show the electrochromic effect due to a very thick tungsten oxide coat. The previously described 500 ml flask and accessories was used. The flask was placed in an ice bath. 335 ml isopropyl alcohol was placed in the flask and cooled at 10 degrees C. Argon was passed slowly over the alcohol. 40 g tungsten hexachloride was added slowly over three hours at 5 to 10 degrees C. The solution was stirred at 5 degrees C. for an hour and then allowed to warm up to ambient temperature (22 degrees C). The solution turned from yellow to blue at 15 degrees C. The solution was stirred 20 hours under argon. It was filtered in air from a very small amount of insoluble material, washing the filter paper with 65 ml isopropyl alcohol.

Addition of 12% (of the solution volume) of a nonionic wetting agent (Mazawet™ DF) provided a solution that was able to make heavy coatings, including multiple coatings without crazing and with good cosmetics.

A single coating on electrically conducting indium tin oxide coated glass at 45 cm per minute removal rate gave a 3570Å coating after it had been heated to 300 degrees C. for an hour. The glass so coated made into an electrochromic cell with 1N sulfuric acid and a platinum counterelectrode, showed a reversible change of 77% (94% to 17%) in optical transmission at 550 nm when subjected to a potential of two volts.

A triple layer coating was made using three coats each made at 45 cm per minute removal rate. Each intermediate coat was heated to 300 degrees C. for 15 minutes and cooled. The final coat was heated to 300 degrees C. for 3 hours. This coating was 9500Å thick.

When tested as in the above paragraph, it reversibly changed 90% (94% to 4%) in optical transmission at 550 nm when subjected to a potential of two volts.

EXAMPLE 25

10.45 g tungsten dioxide dichloride was added to 100 ml isopropyl alcohol (99+%) at 23 to 28 degrees C. with argon passing over the solution in a slow stream. The flask was heated to reflux (75 to 77 degrees C.) for three hours. It was then stirred for 18 hours overnight under argon. It was filtered in air. Six percent Mazawet™ DF was added to improve the wetting of the solution on glass.

Electrically conductive indium tin oxide coated glass was dipped into this solution and removed at a rate of 25 cm per minute. The glass was fired at 300 degrees C. for one hour. When tested as an electrochromic cell as in Example 24, it reversibly changed 69% (84% to 15%) in optical transmission at 550 nm with a potential of two volts.

EXAMPLE 26

4.95 g tungsten oxy-tetrachloride was added to 60 ml isopropyl alcohol at 20 to 25 degrees C. and under argon. The solution was stirred under argon for 20 hours. It was then filtered in air from some insoluble residue and the residue washed with 20 ml isopropyl alcohol.

The filtered solution was used to coat electrically conductive indium tin oxide coated glass by dipping and removing the test piece at a rate of 25 cm per minute. It was fired at 300 degrees C. for one hour obtaining a cosmetically satisfactory coating. An electrochromic cell was made with this glass as in Example 24. It gave a reversible change in optical transmission at 550 nm of 27% (74% to 47%) with a two volt potential.

EXAMPLE 27

10.5 g tungsten tetrachloride was slowly added portion wise, at 22 to 27 degrees C. to 100 ml isopropyl alcohol covered with argon. It was stirred at ambient temperature for 40 hours and filtered in air from some insoluble material. Electrically conductive indium tin oxide coated glass was dipped into the filtrate and removed at a rate of 25 cm per minute. The coated glass was then heated to 300 degrees C. for an hour. A test piece of the coated glass was made into an electrochromic cell as in Example 24. It showed a reversible change in optical transmission at 550 nm of 25% (90% to 65%) when subjected to a potential of two volts.

EXAMPLE 28

9.95 g molybdenum tetrachloride was added to 100 ml anhydrous ethanol (Tecsol™ 3) under argon, slowly, portion wise, at 22 to 28 degrees C. There was some heat of reaction. The mixture was refluxed (75 to 76 degree C.) for six hours. It was stirred under argon at ambient temperature (21 degrees C.) overnight. It was filtered in air and washed with 50 ml Tecsol™ 3 anhydrous. Electrically conductive indium tin oxide coated glass was dipped into the filtrate and removed at a rate of 45 cm per minute. The coated glass was then heated to 300 degrees C. for an hour. A test piece was made into an electrochromic cell as in Example 24. It showed reversible change in optical transmission at 550 nm of 26% (67% to 41%) when subjected to a potential of two volts.

EXAMPLE 29

Specimens of sapphire (25.4 mm disc, 1.00 mm thick), silicon (75.6 mm disc, 0.38 mm thick) and a sample of porcelain coated steel (Erie Ceramic Co.) were coated with a 1500Å coating of conductive indium tin oxide, by sputtering.

The above pieces were then dip coated by removing them from a tungsten solution produced in Example 24 at a rate of 25 cm per minute. They were fired at 300 degrees C. for one hour. They were then tested for electrochromic properties by immersing them in 1 N sulfuric acid in a beaker and using a platinum counterelectrode to complete the cell. All showed some electrochromic effect when subjected to a potential of two and one-half volts. The coated sapphire disc was almost completely transparent to 550 nm light and showed a reversible change of 35% in optical transmission at 550 nm when the above potential was applied. While the changes in the silicon and porcelain were not so easy to quantify, they did show a darkening effect when the potential was applied.

CONCLUSION

In conclusion, the process of the present invention is very amenable to coating electrochromic oxides. This compares favorably to vacuum techniques where refractory oxide deposition typically requires electron beam evaporation, reactive sputter deposition (DC or RF) or RF sputter deposition from a pressed oxide target.

The present method is a nonvacuum technique. Equipment is thus relatively inexpensive. The process is easy to scale and it is amenable to coating very large substrates. The technique can be used to commercially coat glass panes of several square meter areas.

It is economical to coat thick oxide films. Using the preferred dip coating technique, the faster the withdrawal rate, the thicker the film. This compares very favorably to other techniques where, typically, a 5000Å $WO_3$ coating takes roughly 10 times longer than a 500Å coating.

While dip coating is preferred, spray or spin coating can, in the broader aspects of the invention, be used instead of dip coating.

Deposition of a mixed oxide is relatively easy. Solutions of different compounds can be mixed and the mole ratio in the coating solution ultimately becomes the mole ratio in the deposited mixed oxide coating. There is wide control possible over structure. Solution chemistry can be varied to control the degree of prehydrolysis and thus control coating structure. Also, firing conditions can be customized to vary coating density, porosity, or crystallinity.

Finally, substrate coated in accordance with the present invention can be coated on both sides simultaneously if desired.

Of course, it is understood that the above is merely a preferred embodiment of the invention and that various changes and alterations can be made without departing from the spirit and broader aspects thereof as set forth in the appended claims.

The embodiments of the invention in which the exclusive property or privilege is claimed are defined as follows:

1. A method for preparing transition metal coating solutions which are suitable for preparing electrochromic layers and the like, comprising:
   forming a first solution by reacting an anhydrous halide for an electrochromically active transition metal with a $C_1$ to $C_5$ carbon anhydrous at 0 to 80 degrees C., and
   blending in a coating solution, in alcohol, comprising about 5% to about 10% tetraethyl orthosilicate, the ratio of said tetraethyl orthosilicate coating solution to said solution being about 10:90 to about 75:25.

2. The method of claim for preparing transition metal coating solutions which are suitable for preparing electrochromic layers and the like, comprising:
   forming a first solution by reacting an anhydrous halide for an electrochromically active transition metal with a $C_1$ to $C_5$ carbon anhydrous at 0 to 80 degrees C. while simultaneously passing a stream comprising at least one inert gas over said first solution during said reaction; and
   blending in a coating solution, in alcohol, comprising about 5% to about 10% tetraethyl orthosilicate, the ratio of said tetraethyl orthosilicate coating solution to said solution being about 10:90 to about 75:25.

3. The method of claim 2 in which the ratio of transition metal halide to alcohol is from about 5 to 20 weight/volume percent.

4. The method of claim 3 in which includes filtering said first solution after the reaction has completed.

5. The method of claim 4 in which a stream of inert gas is passed over said coating solution during said reaction.

6. The method of claim 4 in which from 5 to 20% of a wetting agent is added to said coating solution to facilitate good cosmetic appearance in thicker coatings.

7. The method of claim 6 in which from 10 to 15% of said wetting agent is added to said coating solution.

8. The method of claim 4 in which said first solution reaction is allowed to continue for several hours.

9. The method of claim 8 in which said transition metals used ar selected from the group consisting of vanadium, chromium, molybdenum, tungsten, iridium, manganese and nickel whereby electrochromic coatings can be obtained.

10. The method of claim 9 in which said transition metal is tungsten.

11. The method of claim 10 in which said transition metal is nickel and an alkali metal alkoxy compound is added to the reaction mixture in a ratio of from about 10% to about 100% by weight of said transition metal halide.

12. The method of claim 11 in which said alkali metal alkoxy includes an alkoxy group which corresponds to at least one of the alcohols being reacted with said transition metal halide.

13. The method of claim 4 in which includes mixing two or more of said first solutions each being formed from a different transition metal halide.

14. The method of claim 4 in which includes using a mixture of two or more of said $C_1$ to $C_5$ alcohols.

15. The method of claim 2 in which said transition metals used are selected from the group consisting of vanadium, chromium, molybdenum, tungsten, iridium, manganese and nickel whereby electrochromic coatings can be obtained.

16. The method of claim 2 in which said transition metal is tungsten.

17. The method of claim 2 in which said transition metal is nickel and an alkali metal alkoxy compound is added to the reaction mixture in a ratio of from about 10% to about 100% by weight of said transition metal halide.

18. The method of claim 2 in which includes mixing 2 or more of said first solutions each being formed from a different transition metal halide.

19. The method of claim 2 in which includes using a mixture of two or more of said $C_1$ to $C_5$ alcohols.

20. The method of claim 1 in which a stream of inert gas is passed over said coating solution during said reaction.

21. The method of claim 2 in which from 5 to 20% of a wetting agent is added to said coating solution to facilitate good cosmetic appearance in thicker coatings.

22. The method of claim 21 in which from 10 to 15% of said wetting agent is added to said coating solution.

23. A method for preparing an electrochromic coating on a substrate having an electrically conductive surface comprising:

preparing a coating solution by reacting at least one nickel halide compound, at least one $C_1$ to $C_5$ anhydrous alcohol and at least one alkali metal alkoxide at 0 to 80 degrees C.;

coating the conductive surface of said substrate with the resulting solution to give a coating of a desired thickness; and drying and hydrolyzing and further condensing said coating to an electrochromically active coating.

24. The method of claim 23 wherein said coating solution is blended with a coating solution, in alcohol, comprising from 5 to 10% tetraethyl orthosilicate, the ratio of said tetraethyl orthosilicate solution to said solution being about 10:90 to about 75:25.

25. The method of claim 23 in which from 5 to 20% of the wetting agent is added to said blend.

26. The method of claim 24 in which from 5 to 20% of the wetting agent is added to said blend.

27. The method of claim 23 wherein said nickel halide comprises nickel chloride.

28. The method of claim 23 wherein said alkali metal alkoxide comprises sodium ethylate.

29. The method of claim 24 wherein said tetraethyl orthosilicate coating solution comprises partially hydrolyzed tetraethylorthosilicate.

30. The method of claim 27 wherein said coating solution is blended with a coating solution, in alcohol, comprising from 5 to 10% tetraethyl orthosilicate, the ratio of said tetraethyl orthosilicate coating to said solution being about 10:90 to about 75:25.

31. The method of claim 27 wherein said coating solution contains from 5 to 20% of at least one wetting agent.

32. The method of claim 30 wherein said silica coating comprises nickel chloride.

33. The method of claim 28 wherein said nickel halide comprises nickel chloride.

34. The method of claim 33 wherein said coating solution is blended with a silica coating solution, in alcohol, comprising from 5 to 10% tetraethyl orthosilicate, the ratio of said tetraethyl orthosilicate coating to said solution being about 10:90 to about 75:25.

35. The method of claim 33 wherein said coating solution contains from 5 to 20% of at least one wetting agent.

36. A method for preparing an electrochromic coating on a substrate having an electrically conductive surface comprising:

preparing a coating solution by reacting at least one anhydrous halide of an electrochromically active transition metal, at least one $C_1$ to $C_5$ anhydrous alcohol and at least one alkali metal alkoxy compound, wherein the ratio of transition metal halide to alcohol is from about 5 to 20 weight/volume percent and the ratio of alkali metal alkoxy compound to transition metal halide is from about 0 to 100 weight/volume weight percent, at 0 to 80 degrees C. while simultaneously passing a stream of inert gas over said coating solution during said reaction;

coating the conductive surface of said substrate with the resulting solution to give a coating of a desired thickness; and drying and hydrolyzing and further condensing said coating to an electrochromically active coating.

37. The method of claim 36 which includes filtering said solution after the reaction has been completed.

38. The method of claim 37 wherein said coating solution contains from 5 to 20% by weight of at least one wetting agent.

39. The method of claim 38 wherein the amount of said wetting agent is from 10 to 15% by weight.

40. The method of claim 37 wherein said reaction is allowed to continue for several hours.

41. The method of claim 40 in which said transition metals used are selected from the group consisting of vanadium, chromium, molybdenum, tungsten, iridium, manganese and nickel whereby electrochromic coatings can be obtained.

42. The method of claim 41 in which said transition metal is tungsten.

43. The method of claim 41 in which said transition metal is nickel.

44. The method of claim 43 in which said alkali metal alkoxy compound includes an alkoxy group which corresponds to at least one of the alcohols being reacted with said transition metal halide.

45. The method of claim 43 in which said solution is blended with a coating solution, in alcohol,
comprising about 5% to about 10% tetraethyl orthosilicate, the ratio of said tetraethyl orthosilicate coating solution to said solution being about 10:90 to about 75:25.

46. The method of claim 36 in which said transition metal is nickel.

47. The method of claim 46 in which said solution is blended with a coating solution, in alcohol, comprising about 5% to about 10% tetraethyl/orthosilicate the ratio of said tetraethyl/orthos coating solution to said solution being about 10:90 to about 75:25.

* * * * *

UNITED STATES PATENT AND TRADEMARK OFFICE
CERTIFICATE OF CORRECTION

PATENT NO. : 4,996,083     PAGE 1 OF 3

DATED : February 26, 1991

INVENTOR(S) : Frank H. Moser et al.

It is certified that error appears in the above-identified patent and that said Letters Patent is hereby corrected as shown below:

Column 1, Line 36:

"$Si_2$" should be --$SiO_2$--.

Column 6, Line 38:

"IN sulfuric" should be --1N sulfuric--.

Column 7, Line 53:

"IN lithium" should be --1N lithium--.

Column 9, Line 6:

"IN sulfuric" should be --1N sulfuric--.

Column 10, Line 23:

"1 N 30 potassium" should be --1N potassium--.

Column 11, Line 35:

"IN lithium" should be --1N lithium--.

Column 12, Line 5:

"IN lithium" should be --1N lithium--.

Column 13, Line 4:

"Teosol$^{TM}$" should be --Tecsol$^{TM}$--.

UNITED STATES PATENT AND TRADEMARK OFFICE
CERTIFICATE OF CORRECTION

PATENT NO. : 4,996,083

DATED : February 26, 1991

INVENTOR(S) : Frank H. Moser et al.

It is certified that error appears in the above-identified patent and that said Letters Patent is hereby corrected as shown below:

Column 13, Line 43:

"IN sulfuric" should be --1N sulfuric--.

Column 15, Claim 1, Line 52:

"for an" should be --of an--.

Column 15, Claim 1, Line 53:

After "anhydrous" insert --alcohol--.

Column 15, Claim 2, Line 60:

After "claim" insert --1--.

Column 15, Claim 2, Line 65:

After "anhydrous" insert --alcohol--.

Column 16, Claim 9, Line 21:

"used ar" should be --used are--.

UNITED STATES PATENT AND TRADEMARK OFFICE
CERTIFICATE OF CORRECTION

PATENT NO. : 4,996,083

DATED : February 26, 1991

INVENTOR(S) : Frank H. Moser, et. al.

It is certified that error appears in the above-identified patent and that said Letters Patent is hereby corrected as shown below:

Column 18, line 22, "wherein" should be --in which--.

Signed and Sealed this

First Day of September, 1992

*Attest:*

DOUGLAS B. COMER

*Attesting Officer*  *Acting Commissioner of Patents and Trademarks*